W. N. WHITELEY.
HARVESTER.
No. 174,040. Patented Feb. 22, 1876.
6 Sheets—Sheet 1.
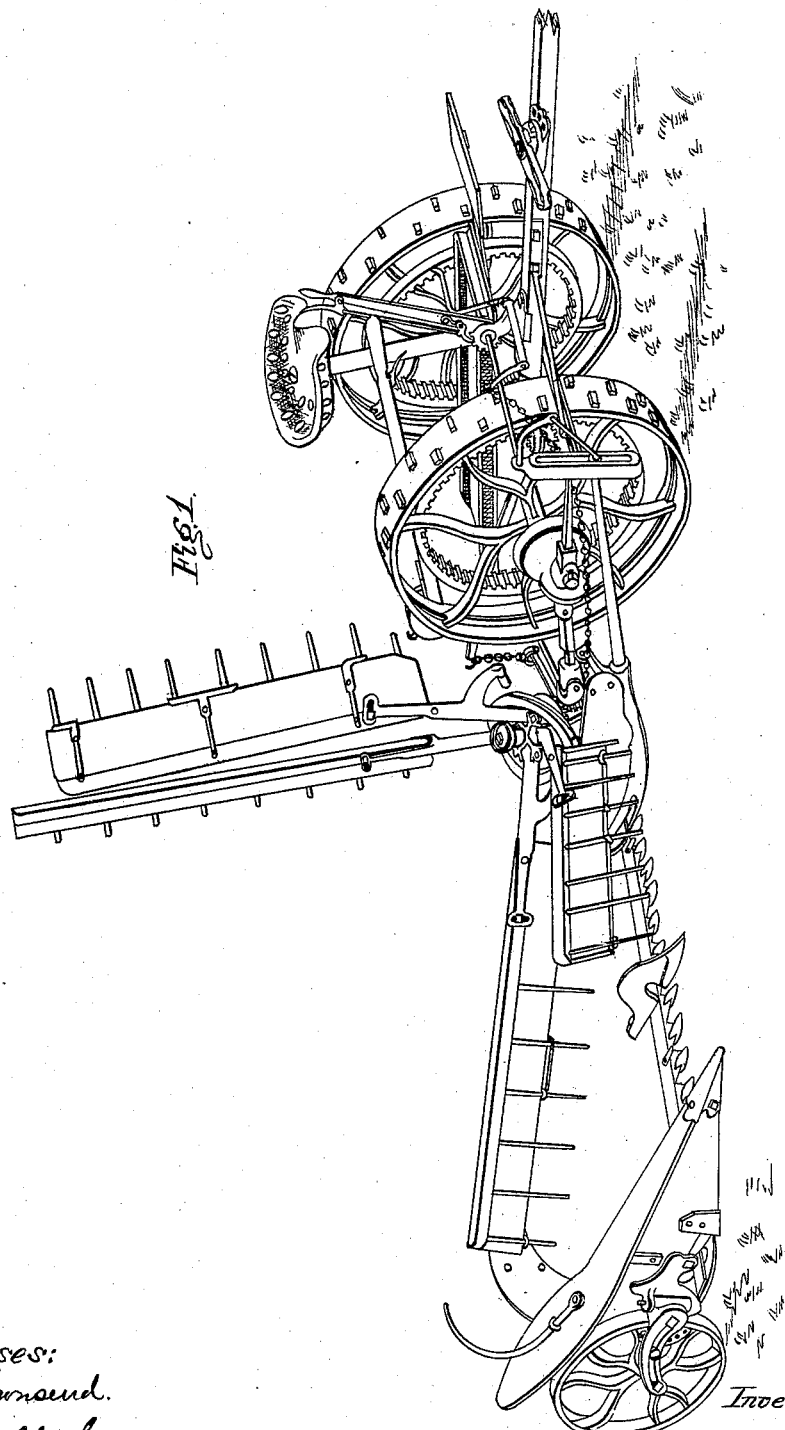
Witnesses:
S. B. Townsend.
E. M. Gallaher
Inventor:
W. N. Whiteley
By his atty
R. O. Smith

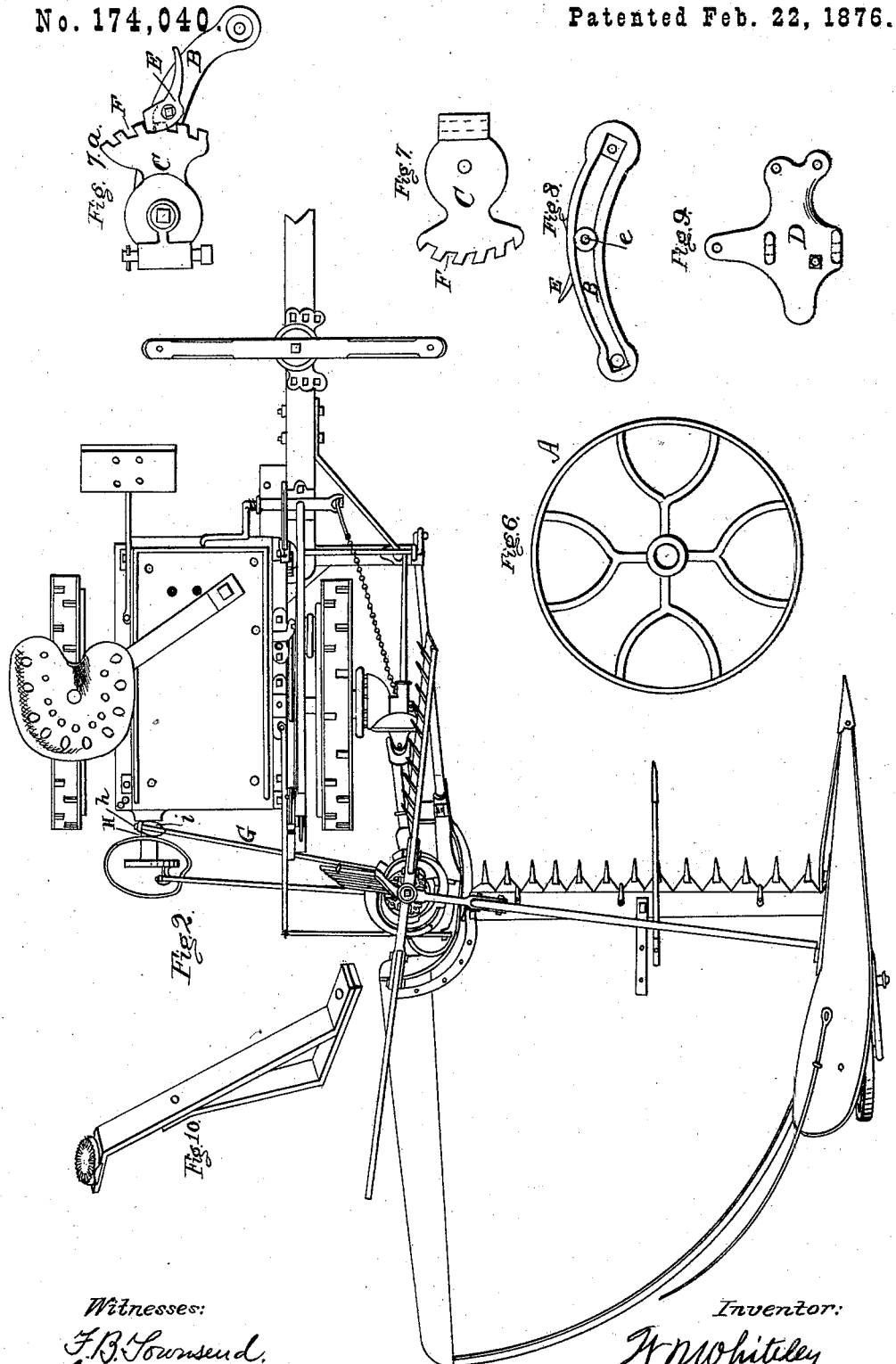

W. N. WHITELEY.
HARVESTER.
No. 174,040. Patented Feb. 22, 1876.
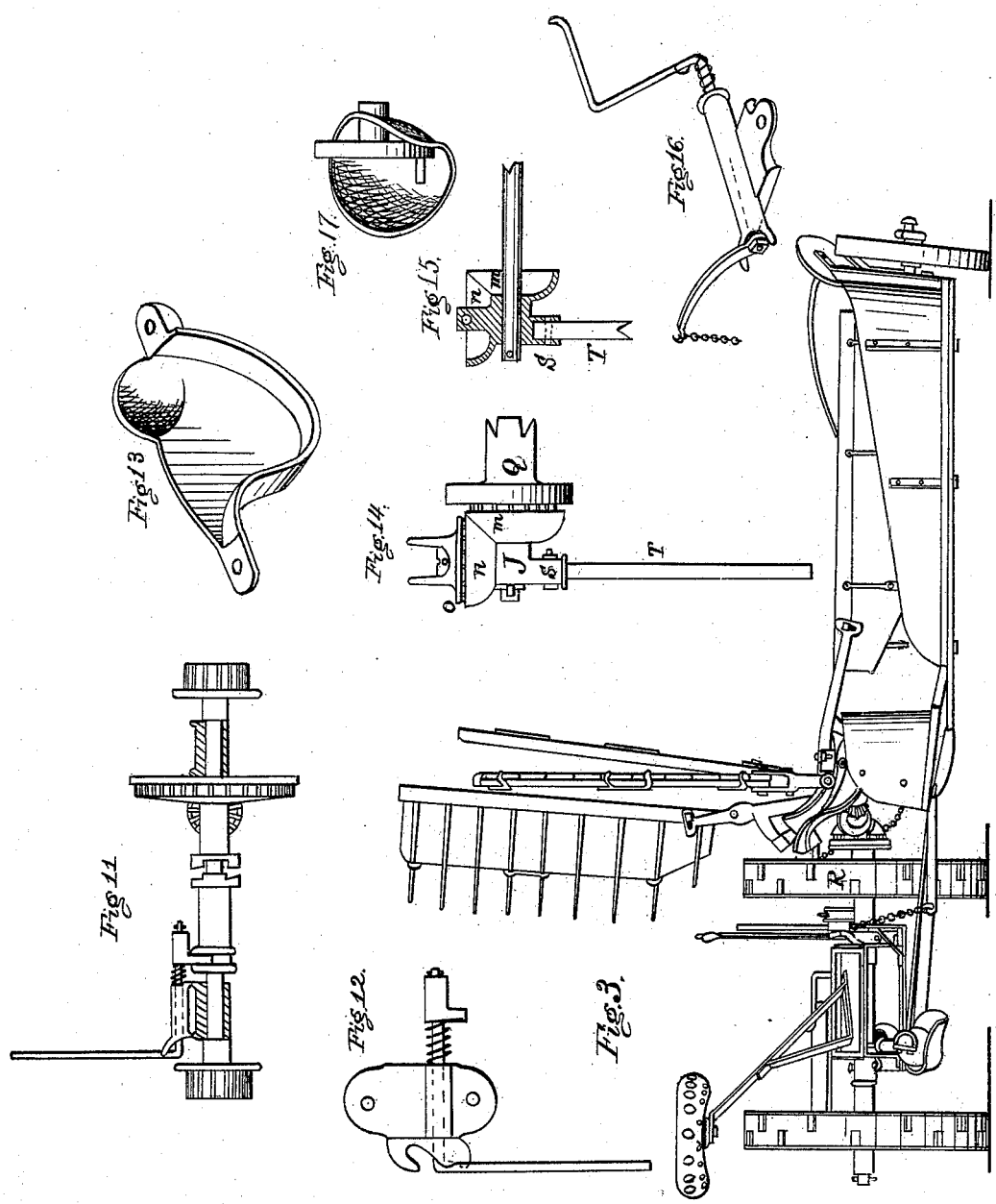
Witnesses:
F. B. Townsend,
E. M. Gallaher.
Inventor:
W. N. Whiteley
By his atty
R. D. O. Smith

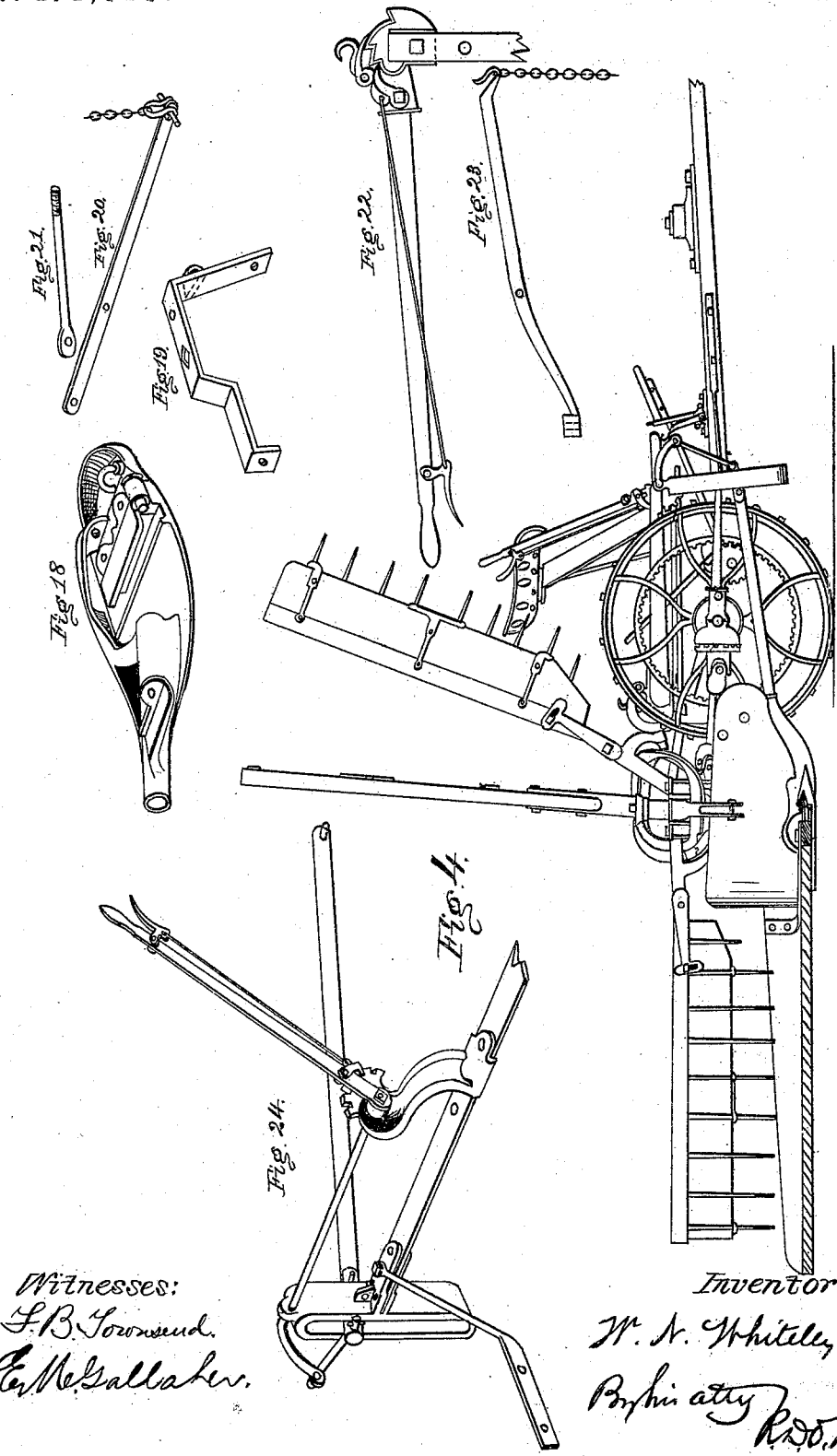

6 Sheets—Sheet 5.
W. N. WHITELEY.
HARVESTER.
No. 174,040. Patented Feb. 22, 1876.
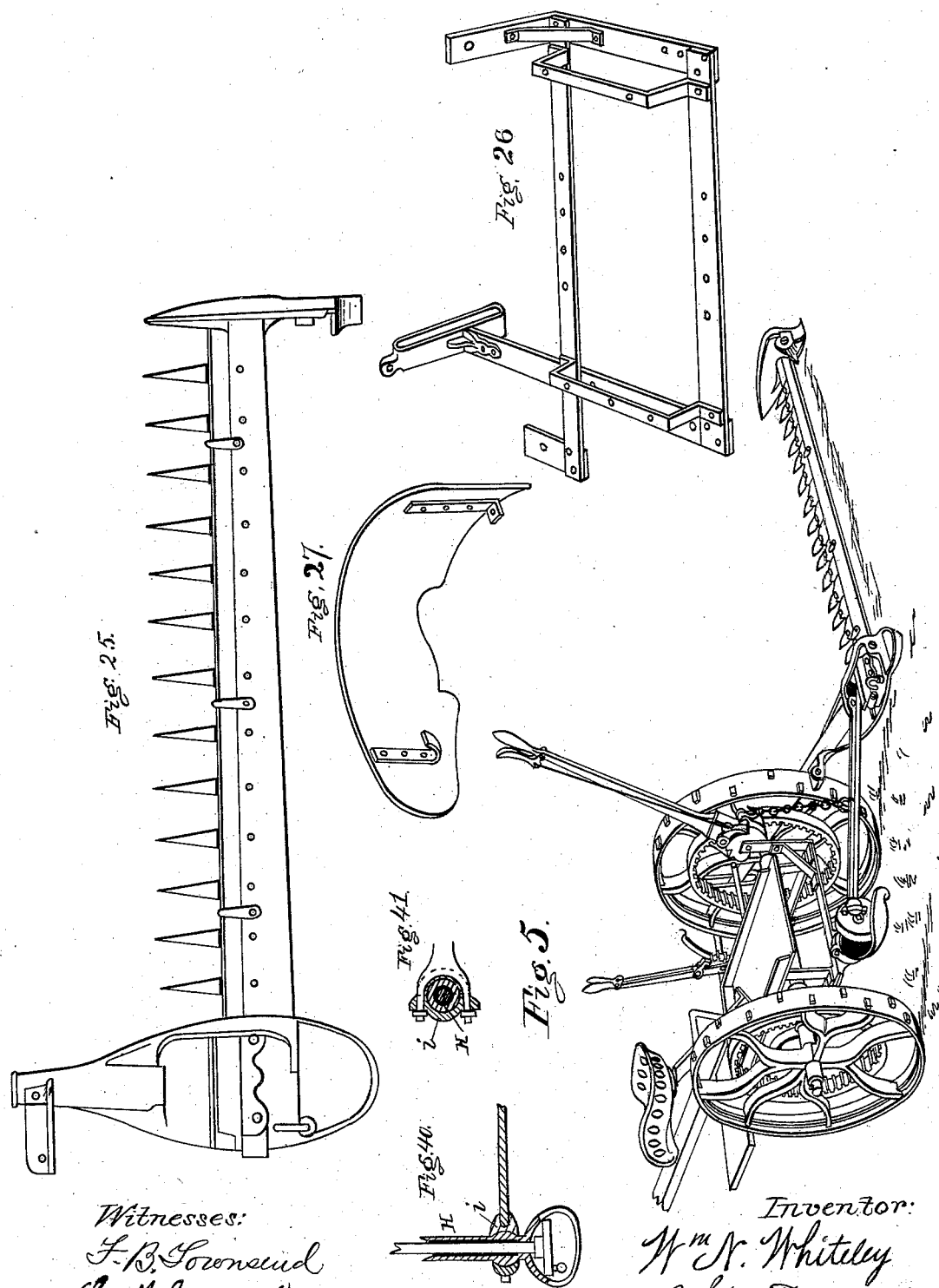
Witnesses:
F. B. Townsend
E. M. Gallaher
Inventor:
Wm N. Whiteley
by his atty
R. W. Smith

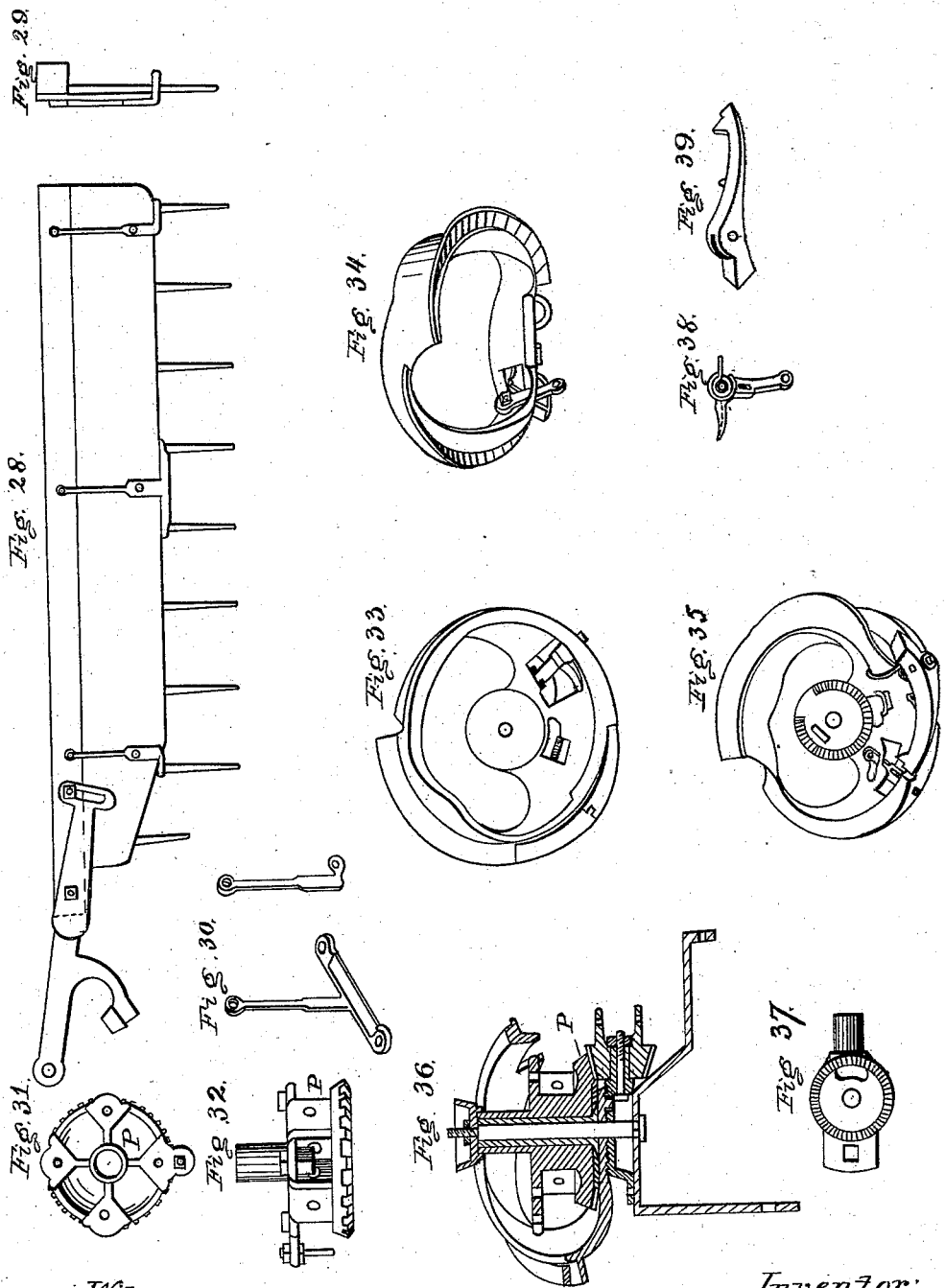

UNITED STATES PATENT OFFICE.

WILLIAM N. WHITELEY, OF SPRINGFIELD, OHIO.

IMPROVEMENT IN HARVESTERS.

Specification forming part of Letters Patent No. 174,040, dated February 22, 1876; application filed December 22, 1875.

*To all whom it may concern:*

Be it known that I, WILLIAM N. WHITELEY, of Springfield, Clarke county, Ohio, have invented a new and useful Improvement in Harvesters, of which the following is a specification:

This invention relates to an improvement in that class of reapers known as "revolving self-rakes;" and it consists in certain devices fully described hereinafter.

That others may fully understand my invention I will particularly describe it, having reference to the accompanying drawings, wherein—

Figure 1 is a perspective view of my machine in full operative condition. Fig. 2 is a plan of the same. Fig. 3 is a rear elevation of the same. Fig. 4 is an inner side elevation of the same, the platform and cutting apparatus being in section. Fig. 5 is a perspective view of my machine as a mower. Fig. 6 is an elevation of the main wheel. Figs. 7, 8, and 9 are elevations of the caster-wheel arms and bracket-plate. Fig. 7$^a$ is an inner side elevation of the caster-wheel arm. Fig. 10 represents the seat-spring in perspective. Figs. 11 and 12 represent the main axle, with gearing thereon, and the shifting-clutch. Fig. 13 is the gear-wheel shield. Fig. 14 is a plan of the combined box and shield for the rake-driving gear. Fig. 15 is a central section of the same. Fig. 16 is the foot-lever for tripping the switch. Fig. 17 is the crank-shield. Fig. 18 shows the inner shoe in perspective. Fig. 19 shows the rake-arch in perspective. Fig. 20 is the arm for suspending the inner shoe. Fig. 21 is the rake-arch brace. Fig. 22 is the lifting-lever for the inner end of cutting apparatus. Fig. 23 is the crane-arm. Fig. 24 represents in perspective the rock-shaft and lever for lifting the front end of the drag-bar. Fig. 25 represents in plan the cutting apparatus. Fig. 26 represents in perspective the main frame. Fig. 27 represents the inner shoe-shield. Fig. 28 is an elevation of the rake-beater. Fig. 29 is an end elevation of the same. Fig. 30 represents the rake-stays. Fig. 31 is a plan of rake-revolving head. Fig. 32 is a side elevation of the same. Fig. 33 is a plan of rake-cam. Fig. 34 is a perspective view of the same. Fig. 35 is a bottom plan of the same. Fig. 36 is a central sectional elevation of the same. Fig. 37 is a plan of cam base plate. Fig. 38 represents the switch-latch. Fig. 39 represents the switch. Fig. 40 is a horizontal section through the crank-shaft box and lateral-brace joint. Fig. 41 is a transverse section of the same.

My machine is provided with a main frame, which I prefer to construct of wrought metal, in the form shown in Fig. 26, and is supported upon two bearings and driving-wheels, mounted on the ends of an axle, which is secured in boxes screwed fast to the side bars of said main frame. The driving-gearing is mounted upon a counter-shaft in front of the main axle, and receives motion from cog-rims upon the driving-wheels, which gear with pinions upon the ends of the counter-shaft.

The cutting apparatus is advanced by a drag-bar, which has its rear end attached to the inner shoe, and its front end passed through a vertical slot in the main frame, and controlled by a rock-shaft and lever, so that the points of the cutters may be tipped up or down, as occasion may require, while the machine is in motion. The inner end of the cutting apparatus is supported by an arm, which is bolted firmly to the inner shoe, and projects laterally therefrom, and is attached by a chain to a crane-arm extended backward from the main frame for that purpose. When mowing the said arm is removed, and the supporting-chain is connected at its lower end to the lateral brace, and its upper end to the lifting-lever, which enables the driver to raise or lower the cutting apparatus at will, as may be required by the surface over which the machine is advancing.

The cutting apparatus has the usual scalloped cutter and open guard-fingers, and is supported at its outer end upon an adjustable caster-wheel, A, the axle-pin of which is set in the end of an arm, B, the opposite end of which is jointed to a plate, C, which is hinged to the outer shoe-bracket D. The plate C moves upon a vertical hinge-pin, and the arm B moves upon a horizontal pin, so that the wheel A may be adjusted up or down as respects the outer shoe and platform, and thereby be caused to carry the outer shoe the desired height above the ground. Heretofore the adjustment of the arm B upon the plate C has been commonly effected by the placing of a pin in one of the series of holes usually made near the edge of the plate C; but I prefer the latch E, (shown in Figs. 7, 7$^a$, and 8,) and the oblique notches F. (Shown in Figs. 7, 7$^a$.) The latch E is pivoted to the arm B by a pin at $e$, and is provided with a spring to close it and insure its engagement with the notches F. These notches are cut in the edge of plate C. Studs or pins may be substituted if more desirable, so that when in engagement no pressure, either upward or downward, will cause its disengagement. To produce this result it is only necessary to cut said notches, so that two arcs concentric with the axis of the latch, and cutting the upper and lower peripheral edges of said notch, respectively, shall fall within and between the sides of said notch, as will be perceived by inspection of Fig. 7$^a$. If the plate C is raised up, so as to produce downward pressure upon the outer end of arm B, the points of the notches F project upward under the nose of the latch E, and so far that it cannot become disengaged without an upward movement of the wheel A and outer end of the arm B; and a downward pressure upon said joint cannot disengage the latch, because the obliquity of the notch F will then tend to drive the nose of the latch deeper into the notch.

In changing the adjustment of the arm B upon the plate C with my latch, it is only necessary to employ one hand to support the arm B, and, with the thumb of the same hand upon the tail of the latch F, the same may be disengaged and held out of engagement until the arm B is raised or lowered to the proper point, and thus the other hand is left free.

The inner shoe and cutting apparatus are supported laterally by a brace, G, which extends from said shoe to the crank-shaft box near its rear end, where it is seated with a spherical joint axially coincident with said shaft. To accomplish this end I construct the tubular box H of said crank-shaft with a spherical boss, $h$, near its rear end, and to this spherical boss the box $i$ at the outer end of the brace G is fitted, so that said brace is capable of movement in any direction on said box, and said movements are all positive and axially coincident with the crank-shaft.

At the end of the main axle nearest to the cutting apparatus is the combined box and shield J, Figs. 14 and 15. Said box is a solid casting, provided with two saucer-shaped flanges or shields, $m$ $n$, at right angles to each other, the former having an axial socket to receive the end of the main axle, which is retained in place by a pin or other equivalent contrivance. The shield $n$ has an axial stud to receive the pinion $o$, whereby motion is imparted to the revolving shaft, which transmits said motion directly to the rake and reel revolving head P. The gear-wheel Q, which meshes with pinion $o$, is provided with a long hub or sleeve, notched at the end, which fits loosely on the end of the axle, and engages with the spokes of the driving-wheel R. The combined box and shield J may have also a socket, S, to receive the end of the stay-rod or brace T, which is secured by a key in said socket, and extends therefrom forward to the front bar of the main frame to brace the outer end of the main axle. The combined box and shield J provides a firm support for the pinion $o$ on the rake-driving shaft, and it also provides a complete protecting cover for the gear-wheels $o$ and Q.

I claim—

1. The hinged plate C, provided with the notches F $a$ in its edge, and the arm B, pivoted to the said plate C, combined with the latch E, constructed in a sing'e piece, pivoted to the said arm B, and arranged to engage with said notches, for the purpose of regulating the height of the grain-wheel A, as set forth.

2. The lateral brace G, provided with a spherical socket-box, $i$, combined with a spherical bearing, $h$, formed upon and around the crank-shaft box H.

3. The combination box and shield J, arranged at the inner end of the main-wheel axle, to inclose and protect the gear-wheels Q and $o$, which transmit motion from the main wheel R directly to the revolving rake and reel.

W. N. WHITELEY.

Witnesses:
R. D. O. SMITH,
F. B. TOWNSEND.